(12) United States Patent
Santos (10) Patent No.: US 9,856,636 B2
(45) Date of Patent: Jan. 2, 2018

(54) FOG DISPOSAL ARTICLE

(71) Applicant: Shawn Alan Santos, Honolulu, HI (US)

(72) Inventor: Shawn Alan Santos, Honolulu, HI (US)

(*) Notice: Subject to any disclaimer, the term of this patent is extended or adjusted under 35 U.S.C. 154(b) by 270 days.

(21) Appl. No.: 14/499,288

(22) Filed: Sep. 29, 2014

(65) Prior Publication Data
US 2016/0002899 A1 Jan. 7, 2016

Related U.S. Application Data (60) Provisional application No. 62/021,033, filed on Jul. 4, 2014.

(51) Int. Cl.
| | | |
|---|---|---|
| *E03C 1/26* | (2006.01) | |
| *A47J 47/20* | (2006.01) | |
| *C02F 1/28* | (2006.01) | |
| *C02F 1/40* | (2006.01) | |
| *E03C 1/264* | (2006.01) | |
| *C02F 101/32* | (2006.01) | |
| *C02F 103/32* | (2006.01) | |

(52) U.S. Cl.
CPC ............. *E03C 1/26* (2013.01); *A47J 47/20* (2013.01); *C02F 1/285* (2013.01); *C02F 1/40* (2013.01); *C02F 2101/32* (2013.01); *C02F 2103/32* (2013.01); *C02F 2307/08* (2013.01); *E03C 1/264* (2013.01)

(58) Field of Classification Search
CPC .. E03C 1/26; E03C 1/262; E03C 1/264; A47J 47/20; C02F 1/40; C02F 1/285; C02F 2307/08; C02F 2101/32; C02F 2103/32

USPC ................................................... 4/289–292
See application file for complete search history.

(56) References Cited

U.S. PATENT DOCUMENTS

| | | | | |
|---|---|---|---|---|
| 1,313,153 A | * | 8/1919 | Zboyan ............... | E03C 1/264 4/289 |
| 1,450,629 A | * | 4/1923 | Grigg ................ | E03C 1/264 4/286 |
| 1,730,083 A | * | 10/1929 | Melfi ................ | E03C 1/264 4/292 |
| 3,487,439 A | | 12/1969 | Winston | |

(Continued)

FOREIGN PATENT DOCUMENTS

| | | | | |
|---|---|---|---|---|
| GB | 943 182 | * | 12/1963 | ............ A47J 47/08 |
| JP | 19950176043 | | 1/1997 | |

*Primary Examiner* — J. Casimer Jacyna
(74) *Attorney, Agent, or Firm* — Steven R. Gray; Holland & Hart LLP (57) ABSTRACT

An article for properly disposing of FOG so that it does not enter and clog a pipe of a kitchen sink drain. The article may comprise a top opening for receiving said FOG, said opening defined in one embodiment by a perimeter rim configured for placement along the bottom sink surface surrounding the drain, and a body below the perimeter rim and the top opening, the exterior of the body defined by a membrane having a shape for fitting stably within the drain. In one embodiment, the entire lower interior of the membrane body is filled with absorbent material for absorbing FOG. In one embodiment, the absorbent material may be separable from the article body, for disposal of the absorbent material without the body. In one embodiment, the body volume may be configured for receiving an amount of FOG generated by one session of home cooking.

22 Claims, 7 Drawing Sheets

(56) References Cited

U.S. PATENT DOCUMENTS

| | | | | |
|---|---|---|---|---|
| 4,419,232 A | * | 12/1983 | Arntyr | E03C 1/262 |
| | | | | 210/164 |
| 4,555,339 A | * | 11/1985 | Graves | A47J 43/28 |
| | | | | 210/244 |
| 5,196,040 A | * | 3/1993 | Malloy | B01D 46/0002 |
| | | | | 126/299 R |
| 6,387,261 B1 | * | 5/2002 | Mojena | B01D 24/008 |
| | | | | 210/315 |
| 6,537,446 B1 | * | 3/2003 | Sanguinetti | E03F 5/0404 |
| | | | | 210/163 |
| 6,837,261 B2 | * | 1/2005 | Rentschler | B29C 45/14311 |
| | | | | 123/336 |
| 7,467,425 B2 | | 12/2008 | Harmes | |
| 8,109,671 B1 | | 2/2012 | Baker | |
| 2004/0188448 A1 | | 9/2004 | Hudson | |
| 2010/0288138 A1 | * | 11/2010 | Fiorino | A47J 37/1276 |
| | | | | 99/403 |
| 2011/0315620 A1 | * | 12/2011 | Dove | A47J 36/022 |
| | | | | 210/232 |
| 2012/0279930 A1 | | 11/2012 | Iceton | |
| 2012/0311972 A1 | | 12/2012 | Hunter | |
| 2013/0098920 A1 | * | 4/2013 | Lee | A47J 27/12 |
| | | | | 220/573.1 |

\* cited by examiner fig.5 fig. 6 fig. 7 fig. 8 fig. 9

FOG DISPOSAL ARTICLE

CROSS-REFERENCE TO RELATED APPLICATIONS

This U.S. Non-Provisional Utility patent application claims the benefit, under 35 U.S.C. §119, of U.S. Provisional Patent Application No. 62/021,033 filed Jul. 4, 2014, the contents of which are incorporated herein by this reference in their entireties.

FIELD OF INVENTION

This invention pertains to the field of articles for properly disposing of fat, oil, and/or grease ("FOG"). In particular, the invention relates to articles for preventing FOG from clogging pipes.

BACKGROUND OF INVENTION AND DESCRIPTION OF PRIOR ART

The kitchen is often a busy, hectic place where the stress of having to perform certain tasks within or at prescribed times is compounded by potentially dangerous activities, such as handling hot objects and liquids. Properly disposing of common cooking byproduct FOG in its hot liquid form can be time-consuming and even dangerous. For example, handling and disposing of hot liquid FOG often entails the risk of spillage from and/or "jumping" in small quantities out of a cooking instrument, which can result in burns, damage to surrounding kitchen objects, not to mention create an additional mess. On the other hand, waiting to dispose of FOG can be problematic because the FOG may cool, harden, and congeal to a cooking instrument (such as a frying pan), making cleaning and disposal more difficult. Due at least partly to the lack of attractive alternatives for properly disposing of FOG, FOG is unfortunately often poured in its liquid form down drains, where it flows into drainage pipes. Once in drainage pipes, the FOG cools, thickens, congeals, and sticks to the pipes, slowing water drainage, and eventually clogging and blocking flow altogether. This clogging and blogging causes substantial harm, such as destroying septic tanks, resulting in environmental damage (including soil and/or water contamination) and health hazards, emanating noxious smells, and attracting insects and pests. Conventional methods of removing FOG buildup in pipes are either unsatisfactory or costly. For example, the common practice of boiling and pouring hot water down the pipes only temporarily liquefies FOG, but does not prevent it from re-solidifying further down the line, where it may cause the same problems. Similarly ineffective is the method of pouring detergent down drains along with FOG. Thus, pipes clogged by FOG must often be replaced, which may require the services of a professional plumber.

Although several devices and methods have been created to try and solve the problem of proper FOG disposal, there is still a need for devices, articles, and/or methods that would reduce the amount of time and steps required to properly dispose of FOG in a safe, convenient, economical, and environmentally responsible manner, which would therefore provide a desirable alternative to pouring FOG down a drain.

SUMMARY OF THE INVENTION

For many people, prior art articles, methods, and devices for disposing of FOG simply do not provide a sufficiently attractive alternative to pouring FOG down drains. Pouring hot liquid FOG directly into the trash, for example, is of course not preferable because it can burn through the refuse, garbage bag, and damage the garage container or even start a fire. A noxious odor can also begin to emanate from congealed FOG stored in the trash. Placing FOG in bags or containers with nonrigid or thin membranes, which are then placed in the trash, is similarly undesirable since the containers/bags can be punctured and the FOG can be reheated at some point, causing the FOG to return to its liquid and potentially problematic form. In addition to the risk of puncturing, non-rigid and thin container membranes (such as those made of certain plastics and/or thin metal foil) may also either be melted or deformed by hot liquid FOG and/or bent out of shape by the weight of FOG poured thereon or by external objects. For example, after liquid FOG is poured into containers/bags with non-rigid membranes, such containers/bags are more likely to take the shape of the inside liquid contents, and therefore may be awkward to handle, increasing the likelihood of spilling. The risk of spilling is even greater when/if the bags are not sealed fairly soon after FOG is placed therein. Similarly, if such bag openings are not sealed completely, the lack of a substantially rigid membrane increases the likelihood of the FOG leaking and spilling through breaches in the seal.

On the other hand, containers/bags with thicker and more impervious membranes are generally more costly to produce. Since these costs are normally passed onto consumers, and prior art containers/bags holding congealed FOG must normally be disposed of along with the FOG, it may be impractical for cost-conscious consumers to regularly use and dispose of such more expensive containers/bags. In addition to higher costs, many such containers/bags with thicker less pervious membranes (and even those with thinner, more pervious membranes) are less biodegradable and therefore more harmful to the environment. For example, although some containers might be recyclable when not contaminated with FOG, the congealed and sticking FOG may foreclose such functionality, which may result in additional environmental harm (especially where the container is not biodegradable).

Environmental harm may also be increased unnecessarily (however slightly) by the many prior art containers/bags with sizes substantially larger than the volume of the liquid FOG placed therein. Specifically, when said overly large containers, filled just-partially with FOG, are disposed of in the trash, the unnecessary container material is wasted and also takes up more space in the trash. On the other hand, when such larger containers/bags are used to dispose of FOG in a manner that does not waste material—requiring reuse multiple times for separate instances of FOG-producing cooking activities in order to "fill up" the container volume—then more time-consuming steps are required for proper disposal. For example, many containers/bags appear to be designed to hold approximately one quart of FOG or more, yet the FOG byproduct from one non-commercial cooking session is often much less than a quart. It is not uncommon, for example, that one instance of home cooking generates an amount of FOG byproduct not substantially more than four ounces, and in a range of two to six and a half ounces. Regardless of the precise amount of FOG byproduct generated, the larger containers/bags must often be reused several times before disposal in order to avoid waste of container material, and thus require additional and time-consuming steps relating to such reuse. Such steps include, for example, in the interim between each addition of FOG byproduct from different instances of cooking, the proper storage of both the FOG and container, during which time bacteria and pests may be attracted and/or unpleasant odors emanated. To try and counter these and other negative effects, a FOG-holding container/bag is often either placed in a refrigerator or freezer, thus requiring additional space, attention, and time, or sealed, for example, with a removable lid, and then unsealed when more FOG is placed therein, which sealing and unsealing requires additional time. Suffice it to say that due to several different factors, the extra steps for using a container/bag multiple times to dispose of FOG without wasting (potentially expensive) container material may be undesirable (e.g., too time-consuming) and lead to a person disposing of FOG improperly, such as by pouring it down a drain. Although it would be desirable to have a disposable, environmentally-friendly article that allowed omission of some disposal-steps and that provided a practical, cost-conscious, non-wasteful solution for effectively and properly disposing of FOG, few if any disposable articles are specifically designed to dispose just of the more limited amount of FOG produced in one instance of cooking at home, efficient for such one-time use and without requiring reuse in order to not waste material.

It would further be desirable if such a novel article existed and also comprised other features for easy and safe use (e.g., pouring) without entailing wastefulness of material and/or substantially higher costs. For example, larger containers/bags are not only more expensive to produce than smaller containers/bags (other factors being equal), but in some instances can also be less wieldy in the kitchen, especially when one hand is occupied holding a cooking instrument containing FOG. Moreover, although sealing with a lid may assist in avoiding spilling when a container is placed in the trash, containers with lids are additionally more expensive to manufacture, with the expense normally increasing with the size of the lid. On the other hand, smaller lids require smaller openings, which provide smaller targets for pouring FOG into the containers.

Several other factors in addition to unwieldiness and opening size can also make pouring FOG into prior art containers and bags a somewhat challenging task. For example, hot "liquid" FOG may include lumps, ash, or even small food particles, which inconsistencies can result in irregularities in flow when pouring. Furthermore, FOG may be created in various cooking instruments that are not conducive to pouring in a precise manner, such as cooking pans with gradually curved rims and flat edges (i.e., without spouts or other features for focusing or directing flow of a liquid). The potentially high temperatures of such cooking instruments, moreover, especially immediately after cooking when the FOG is still in hot and liquid form, combined with potentially dirty, oily and/or slippery surfaces due for example to heated FOG particles that may have exited the cooking instrument during cooking, can lead to less sure gripping of the cooking instrument. Similarly, the handle(s) of such instruments may not have been designed to provide optimal leverage, vantage point, or control for pouring. For example, in the case of cooking instruments that are pans, the FOG may normally be poured by holding the pan away from the body with the arm outstretched, and slowly tilting a side of the pan towards the container and attempting to monitor the flow of liquid with the naked eye.

This challenge of controlling pouring the FOG is often exacerbated (whether or not consciously recognized by the person pouring) by an often-raised position of the container/bag due both to placement on elevated kitchen countertops and the large sides of the such prior art container/bag that create an elevated container/bag top opening that may even be higher above the kitchen countertop level. This elevated position of the "point of entry" for the pouring of the FOG may require that the FOG-pouring cooking instrument (e.g., the pan) be held by the arm(s) and hand(s) in an even more lofty and harder to control position. However, the higher the hot liquid FOG is held, the potentially more dangerous such FOG can be if it leaves the confines of the cooking instrument, either by "jumping" from the cooking instrument due to high temperature, or by spilling. Moreover, to achieve greater stability when holding the cooking instrument in a high pouring position, two hands may often be used to grip the cooking instrument or handle(s) thereof—which may leave no hand free to adjust the position of the container/bag according to the point of pouring FOG flow or to stabilize the container/bag, which unbraced-container/bag might then be inadvertently bumped by the cooking instrument (possibly causing spilling). Thus it would be desirable if a container with a substantially rigid membrane existed that allowed more stable pouring of FOG at a lower, more controllable and safe position.

Even when liquid FOG is successfully poured into a container/bag and then placed in the trash, as mentioned above, at some point in the disposal process (e.g., from the garbage to the refuse landfill) the container/bag's membrane may become compromised and the FOG may become reheated and return to a harmful liquid form. Possibly aimed to prevent such situations, some municipalities have prohibitions against placing FOG in the trash in free flowing liquid form, or in a form that can become liquid upon application of heat. Some municipalities may allow, however, disposal of FOG if bound in a stable solid form. This may be accomplished, for example, by the FOG being absorbed by a solid or semi-solid medium. Although different types of absorbent material may provide varying advantages such as weight, rate of absorption, and level of saturation, few methods and devices comprise designs or shapes for more effectively utilizing absorbent material and/or maximizing the space inside a container housing absorbent material. However, effectively utilizing absorbent material and maximizing such container may be beneficial for articles that are intended to consolidate space for purposes of efficiency, size, and convenience. Thus, either to comply with municipal code or simply to avoid the potential disadvantages associated with FOG in liquid form, it would be beneficial if in addition to there being a practical, convenient, and efficient, one-time use, disposable, environmentally-friendly container for disposing of FOG, said container also comprised absorbent material for converting FOG from a liquid form to a semi-stable solid form (notwithstanding application of heat). It would be further desirable if such a container comprised a design of absorbent material for maximizing the amount of FOG saturation in a limited amount of absorbent material volume, and were comprised of substantially rigid membranes and designs lending to stability while pouring FOG therein.

Described herein is such an article for disposing of FOG that overcomes one or more of the aforementioned challenges, such as those associated with substantially non-rigid membranes (which may lead to awkward handling, spillage, and bending/disfiguration of the membrane at the point of FOG contact), having to pour FOG from an elevated position into an elevated point of entry (i.e., opening) of a container/bag, wasting container material, requiring time-consuming steps, being prohibitively expensive (when disposing a container after each session of FOG-generating cooking), not maximizing FOG saturation of absorbent material, and not being environmentally friendly. Said article for overcoming one or more of such challenges may provide consumers among other benefits an attractive alternative and practical solution to pouring FOG into a drain (where it can cause environmental harm).

The article comprises a perimeter rim defining a top opening configured for placement on the bottom kitchen sink surface surrounding a drain of the hollow inward type, so that the body of the article, into which FOG may be poured, lies below the both perimeter rim and the top opening and may generally (but not necessarily always) lie at or below a lower elevation than the bottom sink surface, and fitting within the hollowed inward part of the drain, the body comprising a shape for stably resting within the drain cavity, and for maximizing the body volume for receiving the FOG poured therein. With the article body comprising a shape conforming to and configured to stably fit within the hollow inward cavity of the drain, FOG may be poured into the top opening of the article where it may be stored rather than enter the pipe(s) of the drain. As many kitchen sink drains have circular ring-shaped cross sections (with the inner portion of said ring forming the surface of the drain defining the hollow drain cavity), the article perimeter rim in many embodiments may accordingly be circular, having a circumference wider than the top of the drain contiguous to the kitchen sink bottom surface.

In some embodiments the article body may comprise a membrane perimeter being made of liquid-impervious hard liner material or other rigid exterior membrane that is impermeable to liquid FOG. Other embodiments may comprise an exterior membrane (i.e., membrane perimeter) that is substantially impermeable to liquid FOG. For example, in one embodiment the exterior membrane may by comprised of corrugated cardboard or recycled paper molded to the predetermined drain shape (molded for example utilizing a molded paper pulp process).

Article embodiments may also comprise an interior section of absorbent material, for converting FOG absorbed thereby from a liquid or semi-liquid state to a solid or semi-sold state. In one embodiment, the absorbent material may be at least partly enclosed by the exterior membrane to prevent the FOG from passing through the (potentially oversaturated) absorbent material and into the drain pipes. In some embodiments, the entire lower interior of the membrane body may be filled with absorbent material. Absorbent material may be configured to receive FOG through the top opening. Said absorbent material may also comprise material(s) and designs (as described in more detail below) or other absorbent means for maximizing the amount of FOG capable of being absorbed given the limited body volume (or container size for embodiments comprising containers). The FOG absorbent material in one embodiment may comprise polyurethane, and in one particular embodiment may also resemble a foam sponge comprised of cellulose material (such as wood pulp or other earth-friendly substance). In some embodiments, the entire article and/or the parts thereof may be disposable and/or biodegradable. For embodiments comprising absorbent means, with the FOG converted from a liquid state into an at least semi-solid state, the container may be placed in the trash with less risk that puncturing of the container will result in the FOG contents leaking into the remainder of the refuse.

The article may also comprise additional features for maximizing FOG absorption, such as in one embodiment a cover for placement in the top opening for distributing the FOG poured thereon in a predetermined manner over the absorbent material in order to increase FOG saturation of the absorbent material. Said cover in one embodiment may have a radially positioned array of slotted annular openings for distributing liquid over the absorbent material, the slots being of narrow width to keep the trapped and congealed FOG contained within the body for disposal. In addition to or instead of absorbent material or other absorbent means, some body embodiments may comprise an interior adsorbent surface (which in another embodiment might comprise a removable liner made of, for example, aluminum foil or heavy paper such as wax paper).

In one embodiment, the article may comprise a predetermined size and/or body volume (and amount of absorbent material) for holding an amount of FOG cooking byproduct tailored to a single instance of home cooking. For example, in one particular embodiment the body may have a volume for holding substantially four ounces of FOG and absorbent means configured to receive FOG in a maximum amount within the body volume. A size intended for optimally-efficient one-time use, without requiring additional instances of usage, to efficiently utilize and not waste container material, may allow a user to omit burdensome and time-consuming disposal steps, such as storage, sealing and unsealing a lid multiple times, and placing the container in a refrigerator or freezer.

In one embodiment, the exterior membrane of the body configured for placement in the hollowed inward portion of the drain is rigid (for among other benefits preventing hot liquid FOG poured thereon from compromising the figure of the membrane) and forms a container that stably rests in the drain while FOG is poured into the container through the top opening, with the container sides not stretching substantially above the level of the kitchen sink bottom surface, thus allowing a cooking instrument from which the FOG is poured to be held at a lower elevated and more advantageous position. In some container embodiments, the exterior membrane comprises a rigid outer shell for receiving, holding, and disposing of FOG, which may be separable from the portion of the article comprising the absorbent means. Thus, in some embodiments the FOG absorbent or adsorbent means may be disposed of without the rest of the article also having to be thrown away. In other container embodiments, the entire article may be designed for convenient disposal along with the FOG absorbent/adsorbent means.

The shape of the body configured for placement in a drain may also provide greater stability and less awkward handling while pouring FOG. Moreover, in one embodiment, the body may comprise an inside surface that may be continuously downward sloping, to facilitate continued downward flow of FOG due to gravity and filling of the lowest part of the interior of the container first, or to otherwise strategically pass liquid FOG to the section of absorbent material. With the article stably placed in a drain, the FOG may be poured therein with less risk of spilling, until at a maximum the FOG absorbent means has been fully saturated and/or until an adsorbent means has also reached its full capacity. In one embodiment, the article body may comprise a rigid, flat bottom surface for placement of the container on another flat surface, such as a countertop, with less worry of the FOG spilling. In one particular embodiment having downwardly sloping sides (and as described in more detail in the Description of the Drawings section), the flat bottom surface may have a width of substantially 2.6 inches. Some embodiments (and not necessarily limited to removable shell or container embodiments) may also comprise other features for more convenient and/or safer handling of the article, such as a perimeter rim comprising legs or knobs or other means for holding the rest of the perimeter rim elevated sufficiently above the bottom surface of the kitchen drain surface (yet still not substantially above the kitchen drain bottom surface) to facilitate grabbing with fingers and removing the article from the drain once the FOG has been poured therein.

The relative convenience of simply securely placing the article in the hollowed portion of the drain of the kitchen sink may encourage proper disposal instead of pouring FOG down a drain and serve as an effective reminder to a user to not pour the FOG down the drain. In addition, the stabilized position for holding the container within the hollowed inward drain while FOG is poured therein, without requiring use of other supporting devices (such as a funnel) or stabilization by a person's hand(s), may allow a person to use both hands to carefully pour the FOG into the article.

The placement of the article in the substantially lower-elevated position of the drain, furthermore, such as that found along the floor of a kitchen sink, may allow a person to more easily and in a more controlled manner hold a pan or other cooking instrument at a lower point over the container, thereby avoiding the expenditure of greater energy and allowing more control. Pouring at a level below the countertop level and/or substantially at the surface of a kitchen sink may also be advantageous in the event that hot liquid FOG "jumps" from a container or pan. Being held at a lower elevation, furthermore, takes advantage of the force of gravity and makes such erratic FOG-particle jumping, if it does occur, less likely to result in damage or injury by for example burning a person's skin or causing damage to surrounding objects. For example, with the article (and the top opening—i.e., the point of entry of the poured FOG) placed at such a lower elevation in a kitchen drain or garbage disposal, the sides of a kitchen sink may also act more effectively as protective walls preventing the FOG from causing injury or damage or mess outside the sink area. Moreover, the vantage point of looking down into the article in the drain, and of standing in closer proximity to the container may also assist in careful pouring without spilling. In addition, the size of the top opening of the article may be substantially equal to the width (or diameter) of the drain opening, thereby providing a sufficiently large "target" for pouring the FOG into (when compared to the more narrow openings of some conventional containers). Moreover, due to the fact that the top opening of many article embodiments may not be substantially wider than the drain opening diameter or substantially elevated above the kitchen sink floor surrounding the drain, the article may be placed in the drain without substantially encumbering the area above or around the drain (and especially without encumbering said area with potentially unused container volume), which area might instead be more easily used for careful manipulation of a cooking instrument holding and/or pouring FOG.

Although sealing of the container (in container embodiments) may not be necessary once the FOG has been absorbed and converted into at least partially solid form, in some embodiments (including those without absorbent means) the top opening may close after FOG is poured therein, and may be resealed, and in other embodiments may be reopened and resealed according to user preference.

In some embodiments the article exterior membrane may also comprise supporting bars to provide additional structural support, which may further assist in retaining intended shape without requiring a thicker exterior membrane. It is further anticipated that the article may comprise material, in one embodiment, that is not only impervious to hot liquid FOG, but may also comprise on the outside heat absorbing material, allowing grabbing and holding without risk of burning a person's hand.

Thus the article may allow disposing of FOG in a more expeditious, economical, efficient, environmentally friendly, regulation-compliant, and safe manner. The above-described embodiments are considered that of some embodiments only. It is understood that the embodiments shown in the drawings below and described above are merely for illustrative purposes and not intended to limit scope. Therefore, alterations, modifications, and such further applications as would occur to those skilled in the relevant art(s) are also contemplated.

DETAILED DESCRIPTION OF THE PREFERRED EMBODIMENTS

Figure 1:
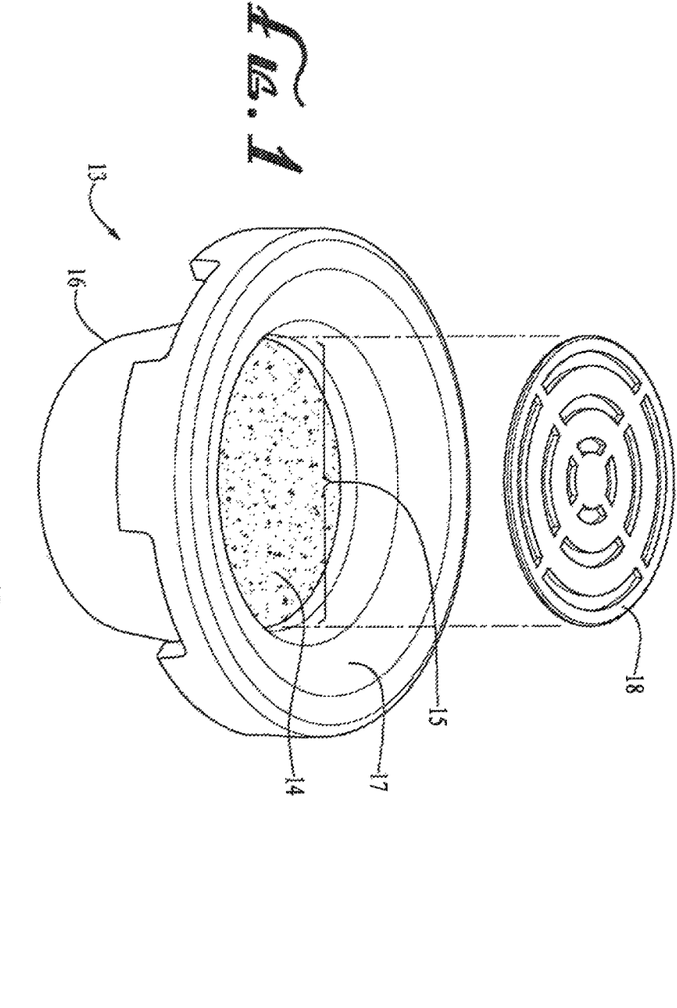
FIG. 1 is a top perspective view of a first article embodiment for disposing of FOG comprising absorbent material and a FOG-distributing cover removed from the top opening.
Figure 2:
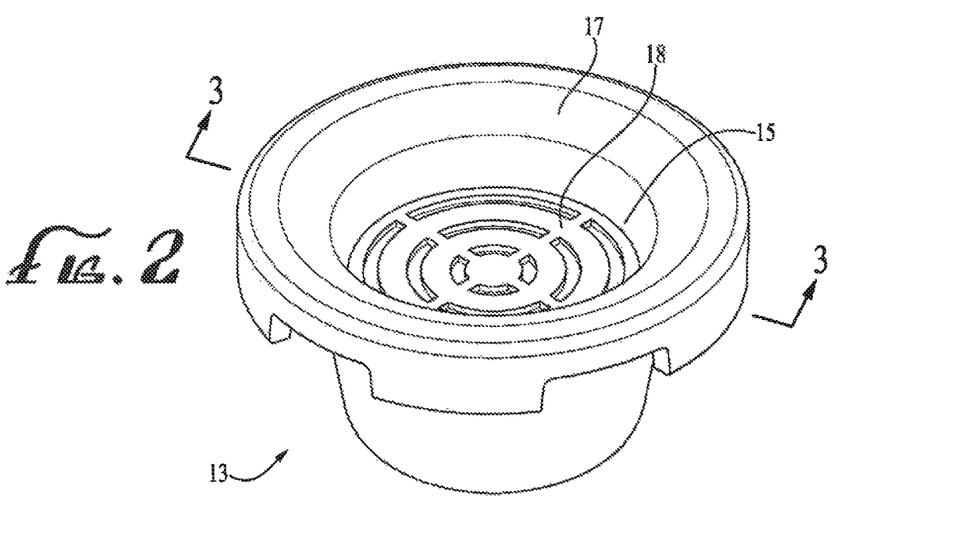
FIG. 2 is a top perspective view of the article of FIG. 1 with the FOG-distributing cover placed over the top opening.
Figure 3:
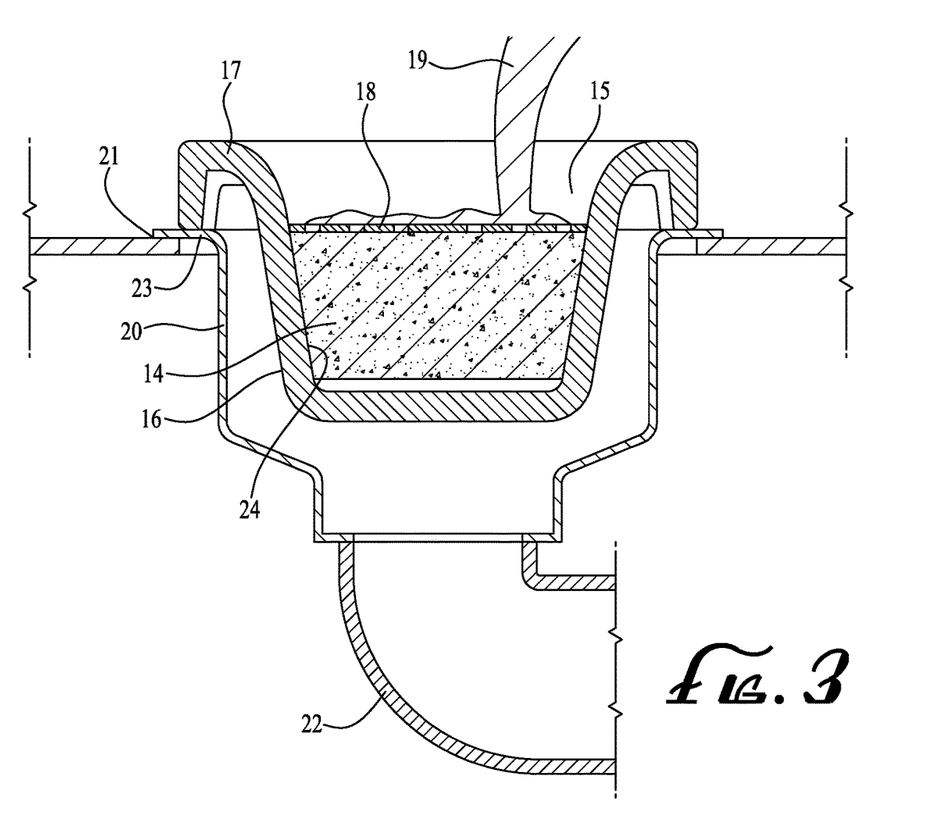
FIG. 3 is a cutaway cross sectional view of the article of FIG. 2 placed in a drain of a kitchen sink.

Turning to the drawings, FIG. 1 illustrates a first article embodiment 13 for properly disposing of FOG. The article 13 may comprise absorbent material 14 contained by an outer body perimeter (i.e., exterior membrane forming a body shape) 16, and a top opening 15 above the absorbent material 14 for receiving FOG there-through, the top opening 15 defined by a perimeter rim 17 having a width wider than the body perimeter 16. The article 13 may also comprise a cover 18 for placement over both the top opening 15 and the absorbent material 14 thereunder, as shown in FIG. 2. The cover 18, in the embodiment 13 shown, when placed over the top opening 15 defined by the perimeter rim 17, may comprise a design for distributing FOG 19 more evenly over the absorbent material 14, as shown in FIG. 3. In addition, the perimeter rim 17 may comprise dimensions and/or have a shape adapted for placement on the bottom kitchen sink surface 21 surrounding a drain 22 of the hollow inward type, so that the article body 16, more narrow than and below the rim 17, may fit within the drain cavity 20 and stably rest therein. The body 16, moreover, may comprise a shape conforming to, the hollow inward cavity of the drain 20 and configured for maximizing the amount of absorbent material 14 and available volume for receiving the FOG 19 therein.

The drain 20 shown, like drains often found along a bottom kitchen sink surface 21, comprises circular ring-shaped cross sections. Accordingly, the perimeter rim 17 of the article embodiment 13 shown is also circular, having a circumference greater than the circumference of the top of the drain 23 (contiguous to the kitchen sink bottom surface 21) for placement thereon, and the body 16 also may also have circular cross sections of sizes for securely placing the article 13 within the concave drain 20. The top opening 15 defined by the perimeter rim 17 may also have a circumference and/or width substantially approximating the circumference and/or width of the top of the drain 23, thereby providing a larger "target" for pouring the FOG therethrough. For example, the combined width of the top opening 15 and the perimeter rim 17 may be in the embodiment shown substantially 4.4 inches. The height of the perimeter rim 17 in the embodiment shown may substantially be 0.75 inches, or other height so that the top opening 15 is not substantially above, or rather substantially even with the level of the bottom sink surface 21. The height from the top of the perimeter rim 17 to the bottom of the article 13 may in the embodiment shown be substantially 2.38 inches. In the embodiment 13 shown, the body 16 may also comprise an inside surface 24 bordering the absorbent material 14 that is continuously downward sloping, and may in the embodiment shown have a pitch of substantially 18 degrees, to facilitate continued downward flow of FOG 19 so that the absorbent material 14 is more likely to become saturated first from the bottom up. In this manner, pouring FOG 19 into the top opening 15 prevents and provides an attractive alternative from FOG 19 being poured down the drain 20 and entering a pipe 22.

Figure 4:
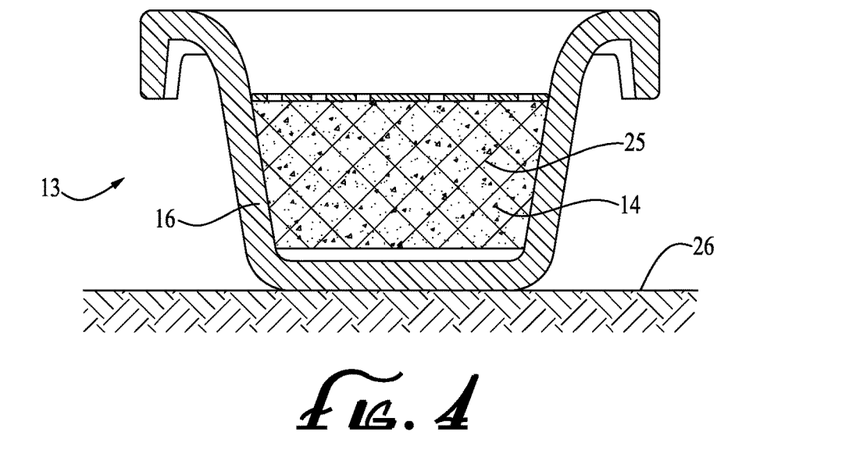
FIG. 4 is a cutaway cross sectional view of the article of FIG. 3 removed from the drain and placed safely on a surface.

The absorbent material 14 in the particular embodiment shown 13 may have a sponge-like texture (may comprise polyurethane), and may convert the liquid FOG 19 absorbed thereby to a solid or semi-sold, more stable state 25, as shown in FIG. 4. So-converted, the FOG is ready for proper disposal and may be removed from the drain of FIG. 3, and placed on another surface 26 (or in the garbage) without fear that the solid-FOG 25 contents may spill from the article 13. Moreover, the perimeter body 16 of the embodiment shown 13 may be comprised of environmentally-friendly rigid/semi-rigid material, such as hard paper liner allowing the article 13 to retain its form even when the liquid FOG 19 therein has not yet cooled or congealed or converted into its solid/semi-solid FOG state 25.

Figure 5:
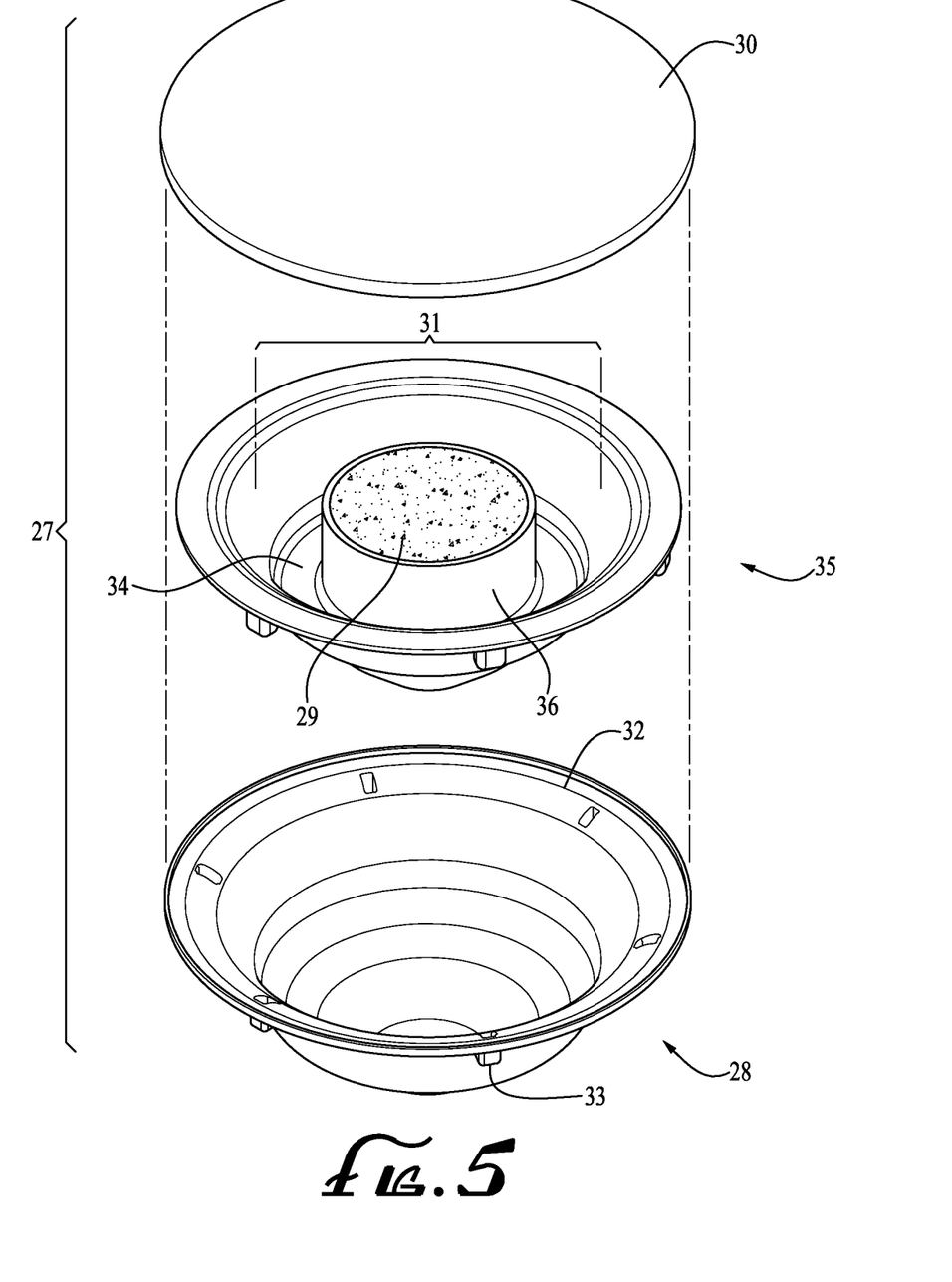
FIG. 5 is a top perspective view of a separated second article embodiment for disposing of FOG comprising absorbent material and a container, and comprising a trough design.

In other embodiments, such as those shown in FIGS. 5-12, the body perimeter 16 may also be rigid and comprise a separable piece from the rest of the article 13. More specifically, as shown in FIG. 5, a second article embodiment 27 for properly disposing of FOG may comprise a body perimeter that is a shell container 28 also having a shape for fitting in a drain 20, similar to that previously-described for the first embodiment 13 above (in FIG. 3), having circular cross sections, and also comprising a perimeter rim 32. The second article embodiment 27 may also comprise a top opening 31, and absorbent material 29 configured for fitting within the shell container 28, and may also comprise a filter 30 for placement over the top opening 31 and absorbent material 29. However, the top opening 31 need not be defined by the perimeter rim 32, but rather may be comprised by a liner piece 35 configured for placement within the shell container 28, which liner piece 35 may also comprise the absorbent material 29. The size of the absorbent material 29 in the second embodiment 27 may also comprise a predetermined size and/or body volume and/or material type for absorbing an amount of FOG cooking byproduct tailored to one instance of home cooking. The perimeter rim 32 may also comprise legs 33 for holding the rest of the perimeter rim 32 elevated to facilitate grabbing as described in more detail below. The second embodiment 27 also comprises a trough 34 overflow area for catching FOG once the absorbent material 29 is saturated. The trough 34 area may be formed by a side exterior membrane 36 enclosing the sides of the absorbent material 29, joined to/intersecting with the downward-middle sloping wall of the liner 35.

Figure 6:
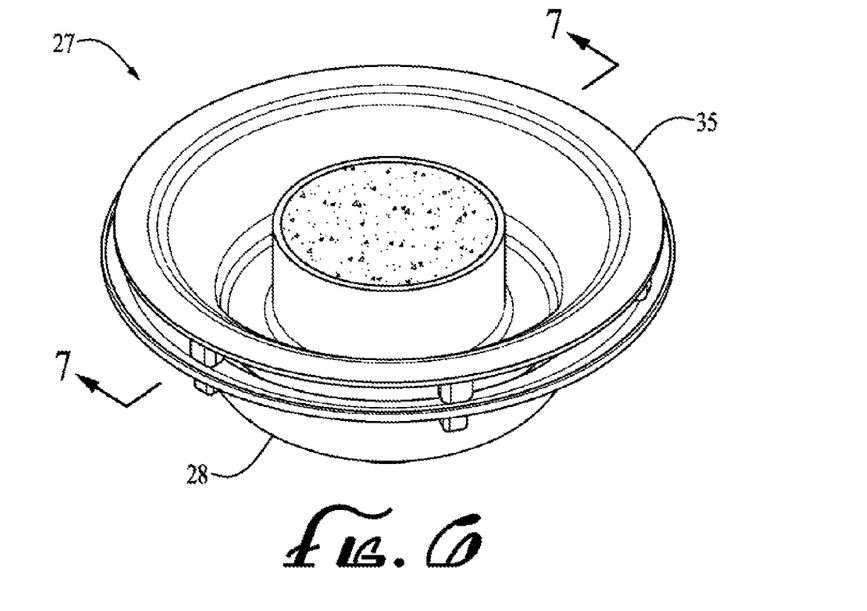
FIG. 6 is a top perspective view of the unseparated article of FIG. 5.
Figure 7:
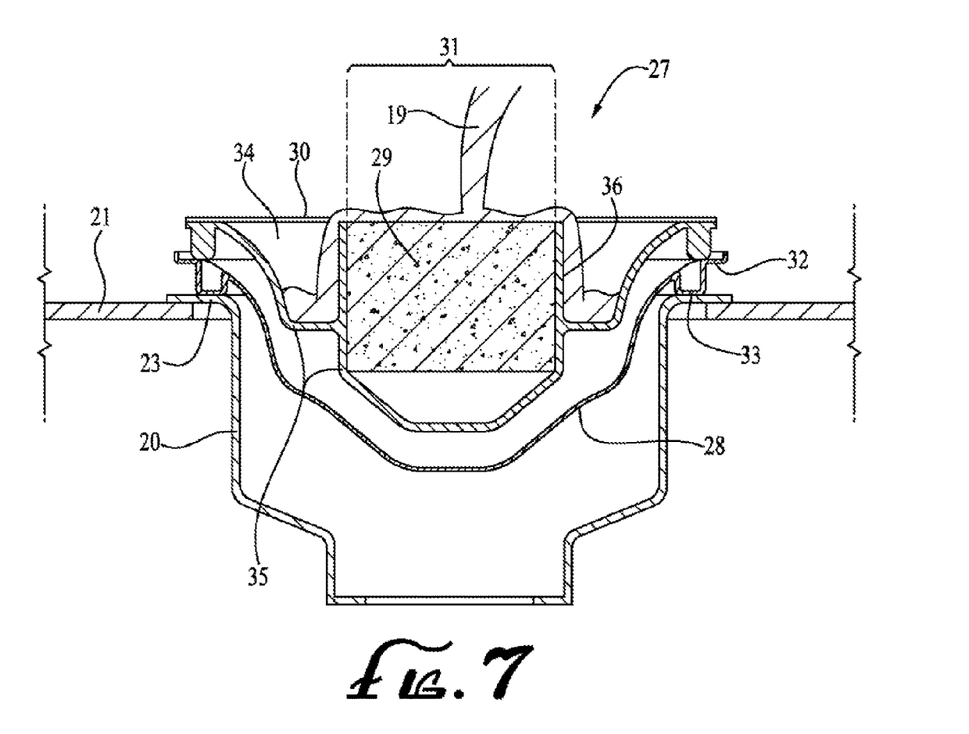
FIG. 7 is a cutaway cross sectional view of the article of FIG. 6, placed in a kitchen sink drain.

As shown in FIG. 6, the liner piece 35 may be placed inside the shell/container 28 (and the liner piece 35 may also be removable from the shell/container 28), and as shown in FIG. 7 the filter 30 may be placed over the top opening 31 and the absorbent material 29, and the article 27 may be placed in the drain 20 along a bottom kitchen sink surface 21, with the legs 33 of the perimeter rim 32 resting along the top of the drain 23 so that the shell/container 28 stably rests inside the drain 20. The trough 34 formed by the absorbent side exterior liner/membrane 36 and the downward-middle sloping wall of the liner 35 may capture any excess FOG 19 that was poured into the filter 30 and top opening 31 but that was not absorbed by the absorbent material 29. After the absorbent material 29 has absorbed the liquid FOG 19, and any excess FOG 19 has been properly dealt with, disposal may occur, either by disposing of just the liner piece 35 (comprising the absorbent material 29) after it has been separated from the shell/container 28, or the entire article 27. Thus the shell/container 28 in one embodiment 27 may assist in providing a more secure fit within the drain 20, and/or providing an extra layer of cautiousness to assure that FOG 19 does not escape down the drain 20.

Figure 8:
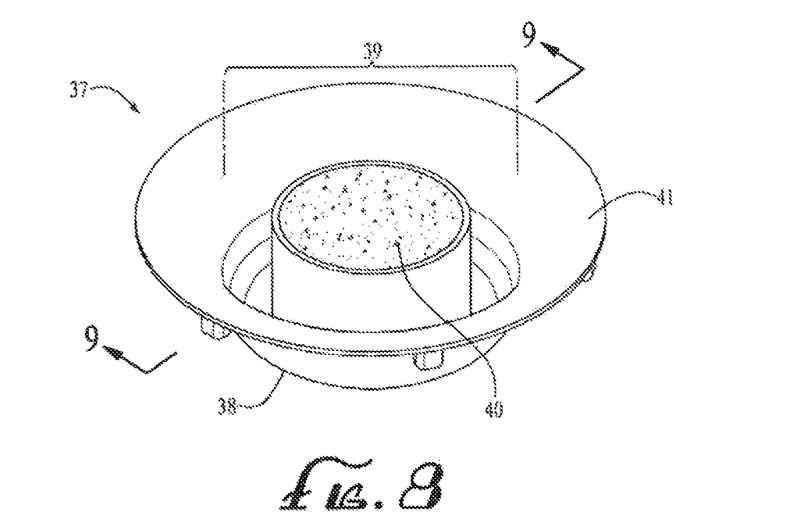
FIG. 8 is a top perspective of a third article embodiment for disposing of FOG.

Other embodiments, like the third article embodiment 37 shown in FIG. 8, may not necessarily comprise the outer shell container 28, but rather may simply comprise a rigid outer membrane 38 for placement within the drain 20. The embodiment 37 also need not comprise a filter 30 (like the second article embodiment 27 shown in FIGS. 5-7) but rather may comprise an exposed top opening 39 defined by a perimeter rim 41, which rim 41 may also be configured for placement over the top of the drain 23 contiguous with the bottom sink surface 21. The outer membrane 38 may also be comprised of substantially rigid material so that it does not lose some of its form when FOG 19 is placed therein and over the absorbent material 40.

Figure 9:
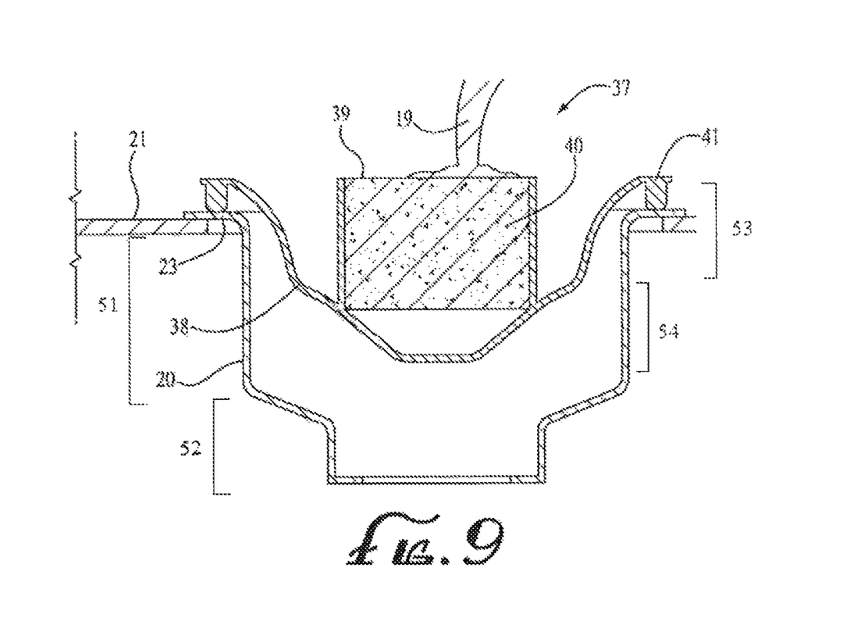
FIG. 9 is a cutaway cross sectional view of the article of FIG. 8, placed in a kitchen sink drain.

As shown in FIG. 9, the hollowed inward part of the drain 20 may have a middle section 51 and a bottom section 52, and the outer membrane 38 may also have a middle section 53 and a bottom section 54 roughly conforming to the middle section 51 and bottom section 52. As shown in FIG. 9, in some examples, the cross section of the middle section 53 may be greater than the cross section of the bottom section 54, the height of the middle section 53 may be greater than the height of the bottom section 54, and/or the slope of the middle section 53 may be greater than the slope of the bottom section 54.

Figure 10:
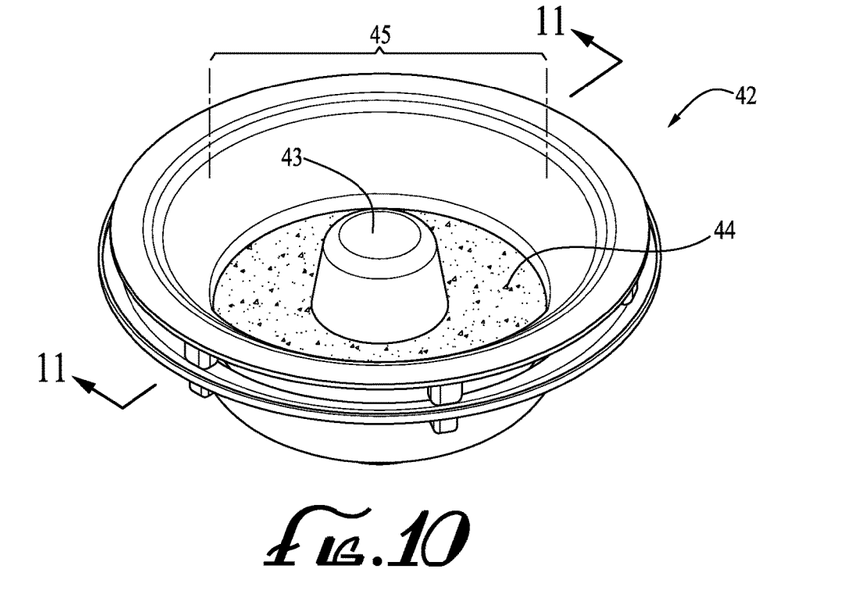
FIG. 10 is a top perspective view of a fourth article embodiment for disposing of FOG, comprising a cone design for distributing FOG evenly to absorbent material.
Figure 11:
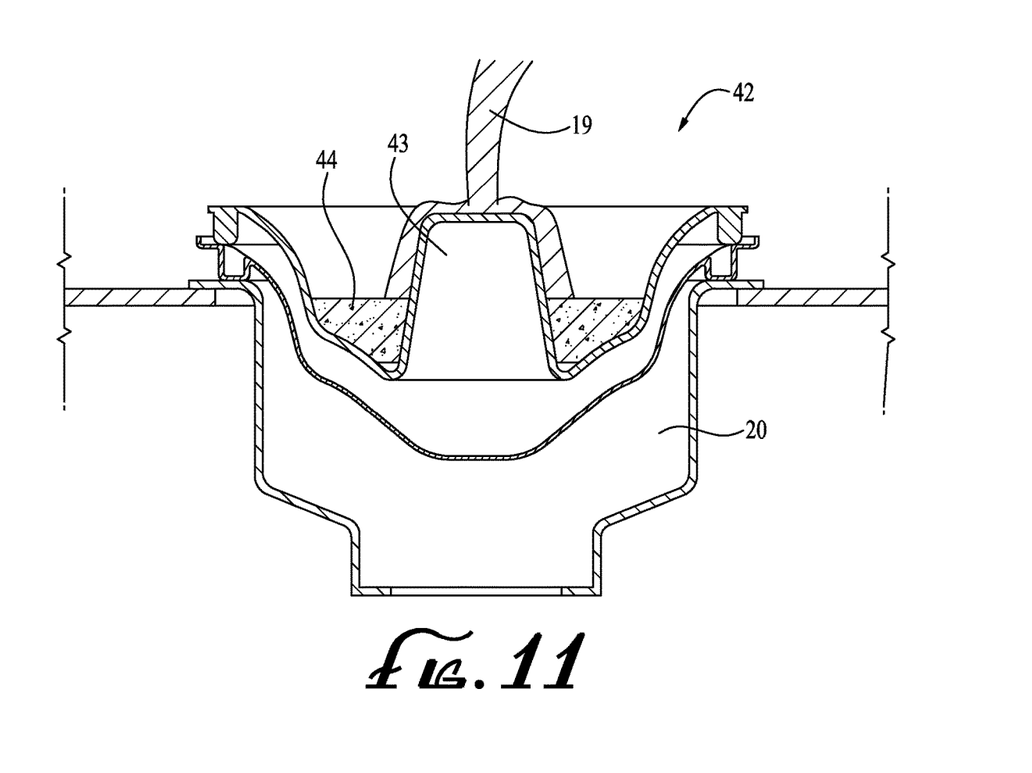
FIG. 11 is a cutaway cross sectional view of the article of FIG. 10, placed in a kitchen sink drain.

The configurations of absorbent material may vary in ways intended to maximize the amount of saturation given limited space. As shown in FIG. 10, a fourth article embodiment 42 may comprise a cone 43 design in the middle of and below the top opening 45 for distributing FOG 19 more evenly to a ring of absorbent material 44 surrounding the cone 43. Thus, as shown in FIG. 11, when the article 42 is placed over and in a drain 20, and when FOG 19 is poured through the top opening 45 and onto the cone 43, which may have a top height greater than the height of the absorbent material 44, the FOG 19 may be distributed to the absorbent material 44 surrounding the cone 43.

Figure 12:
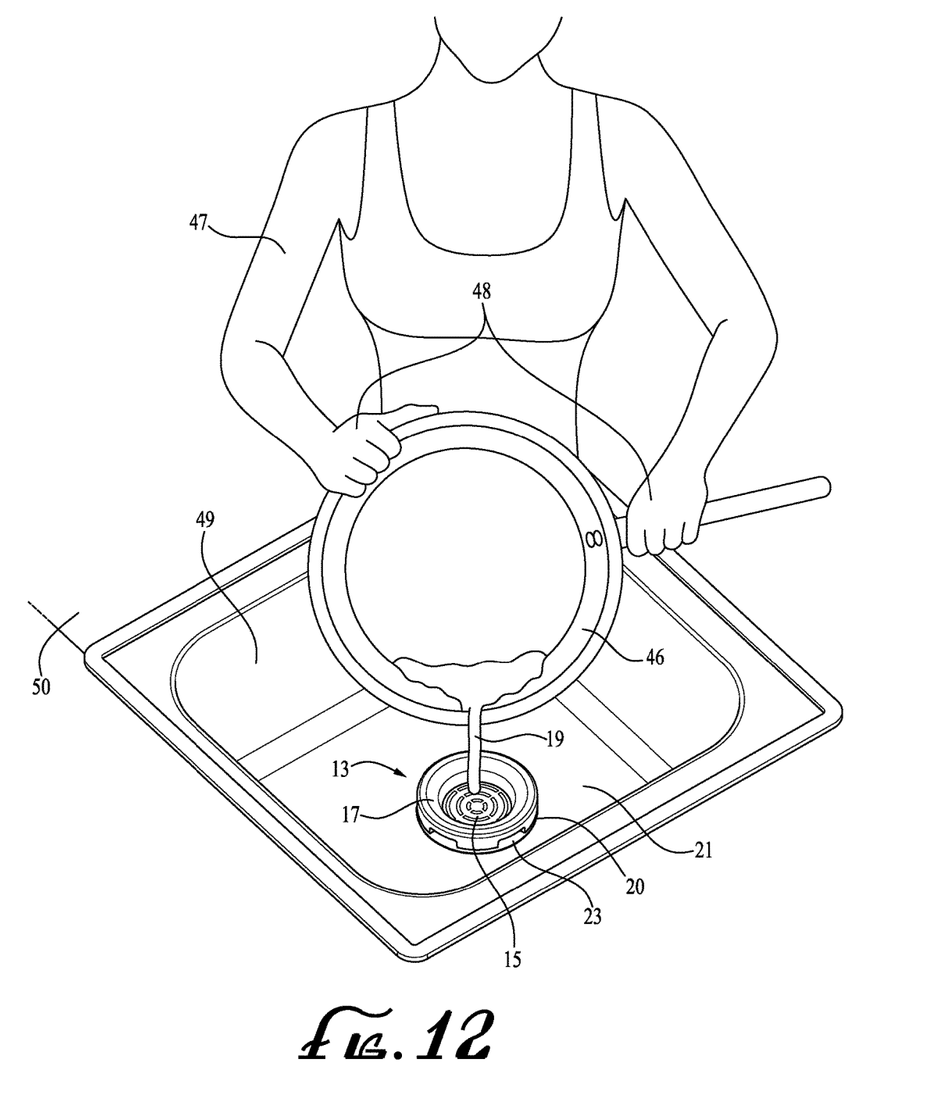
FIG. 12 is an overhead perspective view showing the article in FIG. 1 in its environment of use, stably positioned in a kitchen sink and receiving FOG poured therein.

As mentioned, each embodiment described above 13, 27, 37, 42, in their environment of use may be stably positioned to receive FOG 19 therein in a drain 20 in the bottom of a kitchen sink surface 21, which may be advantageous in several respects, encouraging proper disposal instead of pouring FOG 19 down a drain 20. For example, as shown in FIG. 12, the perimeter rim 17 may rest on the top of the drain 23 in a manner that is not substantially elevated above the bottom sink surface 21. This advantageous position may allow, when disposing of FOG 19 by pouring into the top opening 15 of the article 13, a cooking instrument 46 from which FOG is being poured to be held by a person 47 at a lower and more controlled elevation, and potentially not far above the sink bottom surface 21. Moreover the rigidity of the body 16 (FIG. 1-3) and its shape configured to fit within the drain 20 and its inability to significantly move laterally may provide added stability lending to greater control while pouring FOG 19. In addition, said stability, which can be achieved without a hand 48 having to hold the article 13, may also leave both of a person's 47 hands 48 free to carefully pour the FOG 19 into the article 13. Furthermore, with the article 13 and the cooking instrument 46 both held at a lower elevation, the person 47 pouring may have a more preferable vantage point of looking down at the article 13 in the drain 20, and of standing in closer lateral proximity to the article 13. Also, pouring occurring substantially in the confines of the sink 49 at a level below the countertop 50 may also decrease the likelihood that the hot liquid FOG 19 will erratically jump from the cooking instrument 46 upward and out of sink 49 (which might otherwise damage or and/or dirty surrounding persons 47 and objects).

I claim:

1. An article for disposing of fat, oil, and/or grease (FOG) comprising:
    a top opening defined by a perimeter rim, the perimeter rim configured for placement on at least a portion of a bottom surface of a sink surrounding a drain having a first diameter;
    a body permanently attached to the perimeter rim and located below the perimeter rim and the top opening, an exterior of the body defined by a continuous FOG-impermeable membrane having a concave portion sized to fit within the drain and having a second diameter less than the first diameter of the drain and configured to prevent FOG from exiting into the drain, and an interior of the body comprising absorbent material for absorbing the FOG.

2. The article of claim 1, wherein a top of the drain is contiguous to the bottom surface of the sink and comprises a circumference, and the perimeter rim has a circumference wider than the circumference of the top of the drain; and
    wherein the body comprises a volume configured for holding the FOG generated from one instance of home cooking.

3. The article of claim 1, further comprising a cover for placement over the absorbent material, the cover having a radially positioned array of slotted annular openings for distributing FOG poured thereon over the absorbent material, the slots being of narrow width to keep the trapped and congealed FOG contained within the body for disposal.

4. The article of claim 1, wherein the absorbent material comprises a liner piece separable from the membrane.

5. The article of claim 1, wherein the absorbent material is surrounded on its sides by a liner that is arranged interior to the membrane, and between the liner and the membrane is a trough for capturing excess FOG not absorbed by the absorbent material.

6. The article of claim 2, wherein the absorbent material comprises a ring shape, and the body further comprises a central cone at a center of the ring of absorbent material for distributing FOG to the ring of absorbent material, the central cone having a top height greater than a height of the absorbent material.

7. The article of claim 1, wherein the absorbent material comprises polyurethane.

8. The article of claim 1, wherein the membrane comprises cellulose material.

9. The article of claim 8, wherein the cellulose material comprises recycled paper-based material.

10. The article of claim 1, wherein the membrane comprises an outer rigid FOG-impermeable shell.

11. The article of claim 1, wherein a height of the perimeter rim extends to a height below a countertop surrounding the sink of the kitchen drain.

12. The article of claim 1, wherein the perimeter rim further comprises legs for holding a portion of the perimeter rim elevated sufficiently above the bottom surface of the kitchen drain for grabbing the perimeter rim with fingers.

13. A container for disposing of (FOG), comprising:
    an integrally formed continuous outer shell having a concave portion configured for placement in a drain to prevent FOG from exiting into the drain, the outer shell comprising an at least partially hollow interior, a top opening part, a liquid impermeable bottom part, and a liquid impermeable middle part connecting and contiguous to both the top opening part and the bottom part, the top opening part comprising a rim adapted for placement on a surface surrounding a top part of the drain;
    the middle part and bottom part together comprising a shape conforming at least in part to a hollowed inward part of the drain for placement at least partially inside the drain;
    wherein, the outer shell is configured for placement in the drain to stably receive FOG through the top part without the FOG exiting through the bottom part or the middle part; and
    wherein at least one of the middle part and bottom part further comprises downward sloping edges.

14. The container of claim 13, wherein the drain has a substantially concave shape and the middle part and bottom part of the outer shell comprise cylindrical cross sections conforming to the concave shape of the drain.

15. The container of claim 14, wherein the middle part and bottom part further comprise downward sloping edges.

16. The container of claim 15, further comprising FOG absorbent material located in the interior of the outer shell and filling the lower interior of the middle part.

17. The container of claim 15, wherein the interior of the outer shell of the container comprises an adsorbent surface.

18. The container of claim 15, further comprising biodegradable material.

19. The container of claim 17, wherein the rim further comprises a plurality of knobs slightly elevating the rim above a surface surrounding the top opening part of the outer shell, so that the rim may be grabbed by a person's hand.

20. The container of 15, wherein the bottom part comprises a flat bottom surface for stable placement of the container on a flat surface.

21. The container of claim 15, wherein the top opening part is configured to close and open.

22. The article of claim 1, wherein the drain is a kitchen sink drain, and wherein the perimeter rim has a third diameter greater than second diameter of the body and greater than the first diameter of the kitchen sink drain.

\* \* \* \* \*